(12) United States Patent
Holtzman et al.

(10) Patent No.: US 8,085,249 B2
(45) Date of Patent: Dec. 27, 2011

(54) PRE-ASSEMBLED PART WITH AN ASSOCIATED SURFACE CONVERTIBLE TO A TRANSCRIPTION APPARATUS

(75) Inventors: Raphael Holtzman, San Mateo, CA (US); Jacob Harel, Redwood City, CA (US); Yao Ding, Sunnyvale, CA (US)

(73) Assignee: Luidia Inc., San Carlos, CA (US)

( * ) Notice: Subject to any disclaimer, the term of this patent is extended or adjusted under 35 U.S.C. 154(b) by 924 days.

(21) Appl. No.: 12/062,720

(22) Filed: Apr. 4, 2008

(65) Prior Publication Data
US 2008/0259030 A1 Oct. 23, 2008

Related U.S. Application Data

(60) Provisional application No. 60/912,498, filed on Apr. 18, 2007.

(51) Int. Cl.
*G06F 3/041* (2006.01)
(52) U.S. Cl. .......................... 345/173; 345/177; 345/179
(58) Field of Classification Search .................. 345/158, 345/173, 179; 178/18.01
See application file for complete search history.

(56) References Cited

U.S. PATENT DOCUMENTS

| | | | |
|---|---|---|---|
| 6,266,051 B1 | 7/2001 | Holtzman | 345/173 |
| 6,300,580 B1 | 10/2001 | Shenholz et al. | 178/19.02 |
| 6,414,673 B1 | 7/2002 | Wood et al. | 345/173 |
| 6,639,585 B1 * | 10/2003 | Nagai et al. | 345/173 |
| 6,744,426 B1 * | 6/2004 | Okamoto et al. | 345/179 |
| 6,875,933 B2 * | 4/2005 | Holtzman et al. | 178/18.01 |
| 2001/0000666 A1 * | 5/2001 | Wood et al. | 345/179 |
| 2001/0048430 A1 * | 12/2001 | Shenholz et al. | 345/173 |
| 2008/0169132 A1 | 7/2008 | Ding | 178/19.02 |

FOREIGN PATENT DOCUMENTS

| | | |
|---|---|---|
| KR | 2002-0080669 | 10/2002 |
| KR | 2005-0047314 | 5/2005 |

OTHER PUBLICATIONS

PCT International Preliminary Report on Patentability for PCT Application PCT/US2008/059421.
PCT Search Report for PCT Application PCT/US2008/059421.
3M Digital Media Systems 800 brochure, Available from 3M Visual Systems, 6801 River Place Blvd, Austin Texas, 78726. Retrieved on Oct. 28, 2008 at http://solutions.3m.com/wps/portal/3M/en_US/Meetings/ProductsAndServices/Options/Product_Catalog/DMS800Series/.

* cited by examiner

*Primary Examiner* — Quan-Zhen Wang
*Assistant Examiner* — Troy Dalrymple
(74) *Attorney, Agent, or Firm* — Dov Rosenfeld; INVENTEK

(57) ABSTRACT

An apparatus including a part board having an associated surface or a frame for a surface, such as a whiteboard, that is pre-assembled to include components that when connected to an external module convert the surface to an electronic transcription apparatus. In one version, the components include a set of sensors and electronics therefor, with wiring and a connector.

36 Claims, 10 Drawing Sheets

US 8,085,249 B2

PRE-ASSEMBLED PART WITH AN ASSOCIATED SURFACE CONVERTIBLE TO A TRANSCRIPTION APPARATUS

RELATED APPLICATION

The present invention claims priority of U.S. Provisional Application No. 60/912,498 filed 18 Apr. 2007 to inventors Holtzman, et al. The contents of such US60/912,498 are incorporated herein by reference.

FIELD OF THE INVENTION

The invention relates to electronic transcription apparatuses. More particularly, the invention relates to electronic transcription apparatuses for pre-assembled and/or reconfigurable writing surfaces.

BACKGROUND OF THE INVENTION

Electronic whiteboards and blackboards—in general electronic boards—are known that are configured to detect the position of a pointing device—a stylus—such as a marking pointing device, e.g., a marking stylus, or a non-marking stylus, and, for example, collect coordinate information for use in a computer to track the location over time. One class of such electronic boards uses a set of sensors close to the surface with known geometric relationship to each other, and a pointing device that emits energy detectable by the sensors. A similar technology uses a set of transmitters close to the surface with known geometric relationship to each other, and a pointing device that includes one or more sensors that are able to detect energy emitted by the transmitters.

Luidia, Inc., of San Carlos, Calif. makes a location determining apparatus called eBeam™ that includes a device that attaches to a substantially planar surface and that includes two ultrasound sensors at known geometric relationship to each other, an infrared sensor, analog electronics coupled to the sensors, and a digitizer to convert the analog waveforms from the sensors to digital waveforms. The device can thus detect ultrasound and also detect infrared. A pointing device used as a pointing stylus or with a marking functionality as a marking stylus includes an ultrasound transmitter and an infrared transmitter that when triggered, e.g., by touching the surface or being close to the surface, emits pulses of infrared and of ultrasound. The infrared travels much faster than the ultrasound. Detection of each infrared pulse forms a time mark. Each ultrasound pulse travels via two paths to the two respective ultrasound sensors. The device is configured to digitally detect features of each ultrasound waveform sensed to determine the time of arrival. The device is configured to use this information to determine the location of the pointing device when the pointing device is activated, e.g., when it is close to the surface. The device thus is configured to determine events that include the two-dimensional coordinates of the tip of the pointing device, e.g., when at or close to the surface in the case of such triggering. The pointing device may be in the form of a cover for a felt-tip pen or be a non-marking pointer, and include buttons that when activated cause a computer coupled to the device to carry out one or more actions.

Such a surface together with such a location determining apparatus may also be used to project an image thereon, e.g., using a projector interfaced to a computer. The pointing device can then be used as a virtual "pen" to mark up the projected surface. The pointing device can also be used in the same manner as a computer pointing device such as a mouse. Buttons on the pointing device can be used, for example, in the same manner as mouse buttons.

U.S. Pat. No. 6,266,051 to Holtzman (the Holtzman arrangement) describes retrofittable apparatus for converting a substantially planar surface into an electronic data capture device, in which the components of the apparatus are readily retrofittable to a wide variety of otherwise conventional writing-surface structures, such as whiteboards. Triangulation techniques are used to track the position and motion of a writer or eraser. An encoding facility associated with the pointing implement provides the ability to distinguish whether the implement is used for marking or erasing, and also may determine the nature or character of written line width or eraser swath. A data stream thus generated can be used in a variety of ways, such as for example, to feed information into the memory of a digital computer, and/or to feed information for transmission to remote stations.

Although the Holtzman apparatus provides a mechanism for retrofitting an electronic data capture function to an otherwise ordinary writing surface, the inventors recognize that many elements of a transcription apparatus are inexpensive and can be pre-assembled in components such as whiteboards and projectors and displays, such that, after sale of such a component, the device can easily be upgraded, and can avoid such questions as positioning of sensors and/or calibration. Furthermore, having an apparatus that is easily upgradable may providing a source of additional revenue by providing or licensing others to provide modules that easily upgrade the device.

It further would be advantageous to provide an electronic apparatus that adapts a writing surface such as standard whiteboard into an electronic transcription apparatus that is functional to determine the location of a pointing device, wherein the adapting avoids the use of temporary fasteners and other such expedients.

SUMMARY OF THE INVENTION

One embodiment of the invention includes a pre-assembled apparatus having associated with it a substantially planar surface, or a frame for a substantially planar surface. Examples of substantially planar surfaces include but are not limited to a whiteboard, a blackboard, another writing surface, a planar surface for projection thereon, and a frame for a flat panel display. The pre-assembled apparatus includes built-in components of an electronic transcription apparatus such that the pre-assembled apparatus can be readily converted by a user to an electronic transcription apparatus. The surface associated with the pre-assembled apparatus includes a surface including the surface of a display device. Examples of such a surface include, but are not limited to: a whiteboard, a blackboard, an easel, a wall, a display monitor such as a flat panel display, e.g., an LCD display, a plasma display, a CRT monitor, a projection screen, a tabletop, a writing tablet, and any other surface upon which a user may make marks or for which a user may point out position. The pre-assembled apparatus means a board or a frame for a display or projection thereon, or a projection device that projects onto the surface, and that includes some but not all of the components needed for the electronic transcription apparatus built-in and ready to use. In one embodiment, the built in components include one or more sensors to sense transmissions from a pointing device that transmits energy sensed by the sensors, and further components that enable connection to an external module, e.g., an external module of a set of one or more possible external modules. When connected to the external module, the combination is configured to determine the position of the pointing device, e.g., on or near the surface. One specific example of such a pre-assembled apparatus includes at least two ultrasonic sensors and an infrared sensor, and electronic amplifiers coupled to the sensors to amplify the signals from the sensors cabling, and a connector to connect an external module thereto. In one embodiment, in order to use the built in components, a user connects the external module via the connector. The connecting of the external module automatically defines the resulting transcription apparatus's functionality. Thus, by connecting different external modules, e.g., a module that has been differently pre-configured, either electronically, or, for example, by use of a different connector, different functionality may be achieved. The surface with the pre-assembled parts can thus be easily converted to an electronic transcription apparatus or a projection surface after the manufacture sale thereof and with minimal effort from the user.

One embodiment of the invention includes an easily upgradable pre-assembled surface on a board that includes the sensors and some electronics. In one version, the sensors are at or near the surface. The board can be upgraded to the needed functionality based on the type of external module connected. In another embodiment of this invention the surface is provided with not only a part of the sensing elements, but is also pre-assembled with additional sensors and connections needed for use with an electronic transcription apparatus. The additional sensors and connections include, but are not limited to, video, audio, and/or network components and connections needed to support the transcription apparatus.

In yet another embodiment, the pre-assembled apparatus is a projector that has a surface associated therewith, and that includes sensors in pre-determined locations on the projector.

Particular embodiments include a method of converting a pre-assembled part for use as an electronic transcription apparatus that uses a set of sensors to determine the location of a pointing device that transmits. The method comprises upgrading the pre-assembled part to cause the pre-assembled part to be configured as the electronic transcription apparatus having at least one transcription capability. The pre-assembled part includes built-in electronics, and has associated therewith a surface or a frame for a surface. The upgrading includes a user adding at least one external module, e.g., an external module of a set of possible external modules, the adding of one or more particular external modules causing the pre-assembled apparatus to be configured as an electronic transcription apparatus having at least one particular set of transcription capabilities including the capability that when a pointing device that includes at least one transmitter of energy transmits energy, the transmitted energy is sensed at least some of the set of sensors, and the sensed energy is used to determine the position of the pointing device on or near the surface. Either the pre-assembled part or the external module includes a plurality of sensors.

Particular embodiments include an apparatus configured for upgrading to an electronic transcription apparatus that uses a set of sensors to determine the location of a pointing device that transmits. The apparatus comprises a pre-assembled part having associated therewith a surface or a frame for a surface, the pre-assembled part including built in components including electronic components. Either the pre-assembled part or the external module includes a plurality of sensors. The pre-assembled part is configured such that a user's upgrading the pre-assembled part causes the pre-assembled part to be configured as an electronic transcription apparatus having at least one transcription capability, the upgrading including a user adding at least one external module, e.g., an external module of a set of possible external modules, the adding of one or more particular external modules causing the pre-assembled part to be configured as an electronic transcription apparatus having at least one particular set of transcription capabilities including the capability that when a pointing device that includes at least one transmitter of energy transmits energy, the transmitted energy is sensed by the plurality of sensors, and the sensed energy is used to determine the position of the pointing device on or near the surface.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DETAILED DESCRIPTION OF THE INVENTION

Figure 1:
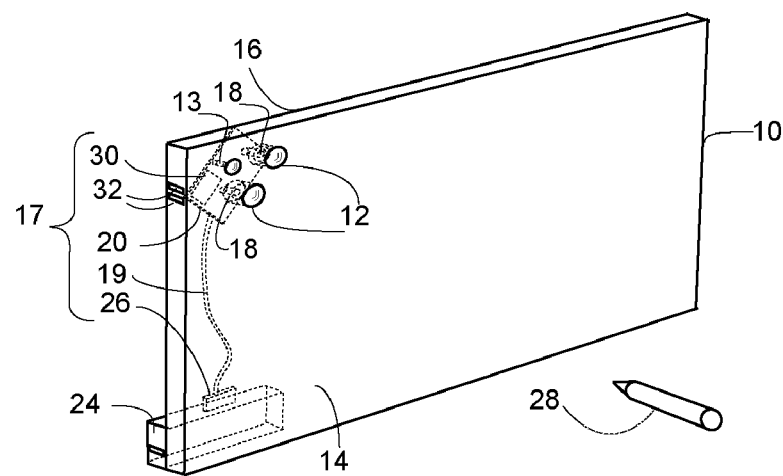
FIG. 1 is a perspective view of an example embodiment of a surface in accordance with this invention.

Described herein is an apparatus including a pre-assembled part having an associated surface that is readily converted for use as an electronic transcription apparatus, and a method of upgrading a pre-assembled part having an associated surface to cause the pre-assembled part to be configured as an electronic transcription apparatus having at least one transcription capability including the capability that when a pointing device that includes at least one transmitter of energy transmits energy, the transmitted energy is sensed by a plurality of built-in sensors, and the sensed energy is used to determine the position of the pointing device. Typically but not necessarily, the location determining is of the pointing device when on or near the surface.

In the description herein, the terms stylus and pointing device are used interchangeable, and refer to a device that is either marking, e.g., one that includes or is used with an inked tip such as a felt tip to impart marks on a surface, or non-marking.

Method and apparatus embodiments of the invention include methods for upgrading a pre-assembled part that has associated a substantially planar writing or projection surface or a frame therefor. Embodiments also include an upgradeable apparatus that includes a pre-assembled part that has associated therewith a substantially planar surface, such as a surface for writing or projecting. The pre-assembled part might include the surface, or a frame for the surface, or may be a projection device for a surface. The pre-assembled part has pre-assembled therein parts of an electronic transcription apparatus and is configured to be upgraded by a user to an electronic transcription apparatus. Such upgrading including attaching at least one external module to the pre-assembled part. Persons of ordinary skill in the art will appreciate examples of substantially planar surface for writing or projection include a whiteboard, a blackboard, an easel, a wall, a display monitor such as a flat panel display, e.g., an LCD display, a plasma display, a CRT monitor, a projection screen, a tabletop, a writing tablet, and any other surface upon which a user may make marks or point out position, such marking possibly including making "electronic" marks using a pointing device. Making electronic marks means causing a machine-driven display, e.g., a projected display to generate marks. Furthermore, for purposes of the description herein, an electronic transcription apparatus means any apparatus by which a user may use a stylus to capture marks and/or issue commands by positioning the stylus relative to the surface. An electronic transcription apparatus therefore is configured to determine the location of the stylus when such a stylus is activated, e.g., by being near or on the surface, or when manually activated by activating a button on the stylus.

One embodiment uses a transcription apparatus that includes a stylus (a pointing device) that includes a transmitter of acoustic, e.g., ultrasound pulses and a transmitter of electromagnetic energy pulses, e.g., infrared pulses, the stylus is for operation with a pre-assembled part that has an associated surface. The pre-assembled part includes embedded or pre-attached acoustic, e.g., ultrasonic sensors at predetermined geometric relationship to each other. In the case of the pre-assembled apparatus including the surface or a frame for the surface, the sensors are close to or at the surface Those skilled in the art will appreciate that other types of transcription apparatuses may also be adapted for use with the invention described herein.

The main embodiments described herein are for the pre-assembled part being a pre-assembled board having a surface or a frame for a surface. How to modify the details described for other types of pre-assembled parts that have an associated surface, e.g., a projection device such as a short-throw projector, would be clear to one of ordinary skill in the art from the description herein.

Referring to FIG. 1, an example embodiment of the invention includes a board 10 that includes a surface 14, which may be a writing surface or a projection surface or the surface of a flat panel display. One example includes a whiteboard of the type commonly found in office environments. Pre-assembled is a plurality of acoustic sensors 18, e.g., ultrasound transducers 18 shown in apertures 12, together with components 17, shown in dotted line form in FIG. 1. Also preassembled is a detector 13 of electromagnetic energy, e.g., of infrared. Such components 17 in one embodiment include electronic components on a circuit board 20 coupled to the sensors 18. The included pre-assembled electronic components 20 in one embodiment include analog amplifiers coupled to analog-to-digital converters to convert sensed signals from the sensors to digital form. Included in the components 17 also is cabling 19 and a connector 26. In another embodiment, the electronics include only the analog components, the cabling, and the connector. Thus components 17 can include, but are not limited to the detection sensors' analog and digital elements and cabling needed for detecting signals transmitted from a transmitting stylus 28. While in FIG. 1 a pair of acoustic, e.g., ultrasound sensors are shown in one corner of the board, such sensors in other embodiments can be placed at other locations around the board to provide the desired detection and placement of the sensor. The number of sensors, e.g., pairs of ultrasound sensors is different for different pre-assembled boards based, e.g., on the size of board. One embodiment also includes a sensor 13 of electromagnetic energy, e.g., an infrared sensor 13.

Figure 2:
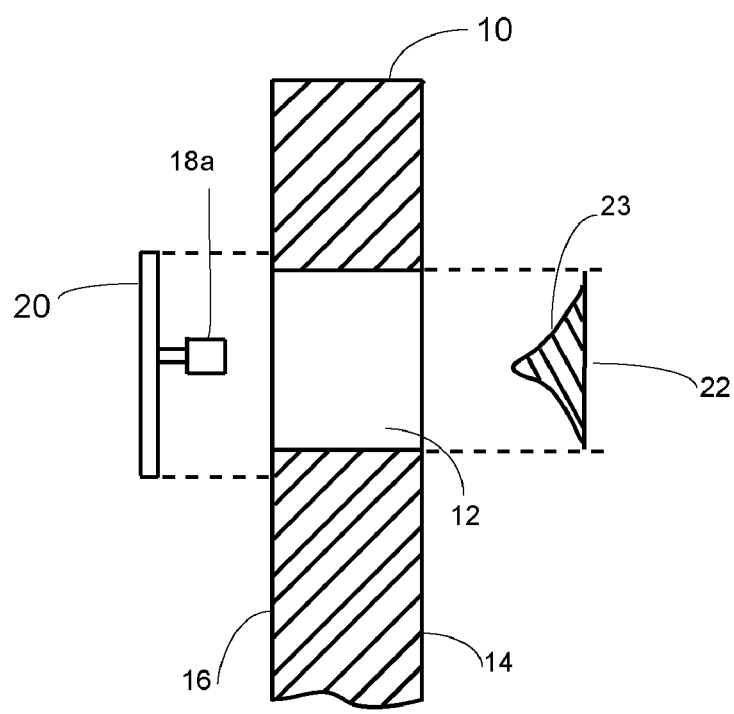
FIG. 2 is a partial cross-sectional view of the writing surface of FIG. 1 and part of an electronic transcription apparatus pre-assembled therein in accordance with an example embodiment of this invention.

Some different embodiments use different types of ultrasound sensors such as transducers 18. One embodiment of the apparatus is shown in FIG. 2, where the electronic transcription apparatuses for use with this invention include ultrasound transducers 18a that are designed to work together with sound focusing elements 22, and that are pre-mounted on a circuit assembly 20, such as a printed circuit board. Circuit assembly 20 may include any part of an electronic transcription apparatus, such as driving and/or interface circuitry for the transducers and/or control components for the apparatus. Circuit assembly 20 supports transducers 18a and positions the transducers to protrude through apertures 12 and extend to or beyond front surface 14 of the board 10.

In addition, as shown in FIG. 2, sound focusing elements 22 are positioned at or near front surface 14 of writing surface 10. Each of sound focusing elements 22 has a surface 23 having a conical, curved, or parabolic shape, such that ultrasound waves emitted from a stylus reflect from surface 23 and are directed to the apertures 12 and ultrasound transducers 18a. In such embodiments of the invention, the incorporation of the transducers into the writing surface itself provides a low profile and reliable mechanism for delivering an electronic transcription apparatus.

One example of such an ultrasound-based transcription apparatus is described in U.S. Pat. No. 6,300,580 to Zloter et al., the contents of which are incorporated by reference herein in its entirety. In one version, the ultrasound transmitter in the pointing device is configured to transmit a train of shaped ultrasound pulses and a train of infrared pulses. For each pair of an ultrasound pulse and an infrared pulse transmitted, the ultrasound sensors and associated electronics are configured to detect one or features in the signal received as a result of ultrasound received at the respective sensor 18, the infrared sensor 13 is used to detect the arrival of the infrared pulse, and the detected features are used to determine the time of arrival relative to the time of arrival of the infrared pulse. These relative times of arrivals are indicative of relative distances to the ultrasound sensors and are sued to determine the location of the transmitting pointing device at the time of transmitting the ultrasound/infrared pulse pair. In general, the external module 24 includes a processor and a storage medium, e.g., memory, on which software is encoded that cause the processor to carry out the position determining. See U.S. Pat. No. 6,414,673 to Wood et al., for details of operation of the detection and location determination of one embodiment. The contents of U.S. Pat. No. 6,414,673 are incorporated herein by reference.

Figure 3:
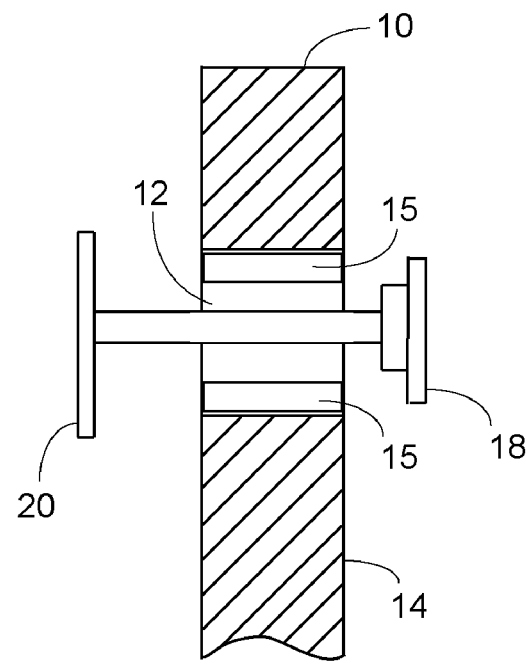
FIG. 3 is a cross section of the writing surface of FIG. 1 and part of an electronic transcription apparatus pre-assembled therein in accordance with another example embodiment of this invention.

FIG. 3 shows a cross-section of another example embodiment of the invention, in which acoustic sensors, e.g., ultrasound transducers 18b are used for the set of sensors 18 and are positioned on or close to the front surface 14 of the board 10 in a manner such that sound focusing elements are unnecessary. The ultrasound sensors in different embodiments may include piezoelectric film transducers, silicon MEMS microphones, electret microphones, or other sound transducing mechanisms suitable for mounting at or close to the surface that does not require a focusing element. In one embodiment, the transducers are spring-loaded, such that the transducers protrude from front surface 14 when the electronic transcription is desired to be used, and may be retracted when use of the electronic transcription apparatus is not desired. In one such version, the combination of each the transducers and the cavity 12 includes a click-on-click-off spring loaded mechanism 15. In addition, in on embodiment, a compressive spring retaining mechanism also may be included to pull a retaining portion of transducers 18b into compressive abutment with front surface 14 and pull a retaining portion of electronics assembly 20 into compressive abutment with back surface 16. How to incorporate such a click-on-click-off spring loaded mechanism and/or such a compressive spring retaining mechanism would be clear from the description herein.

Figure 4:
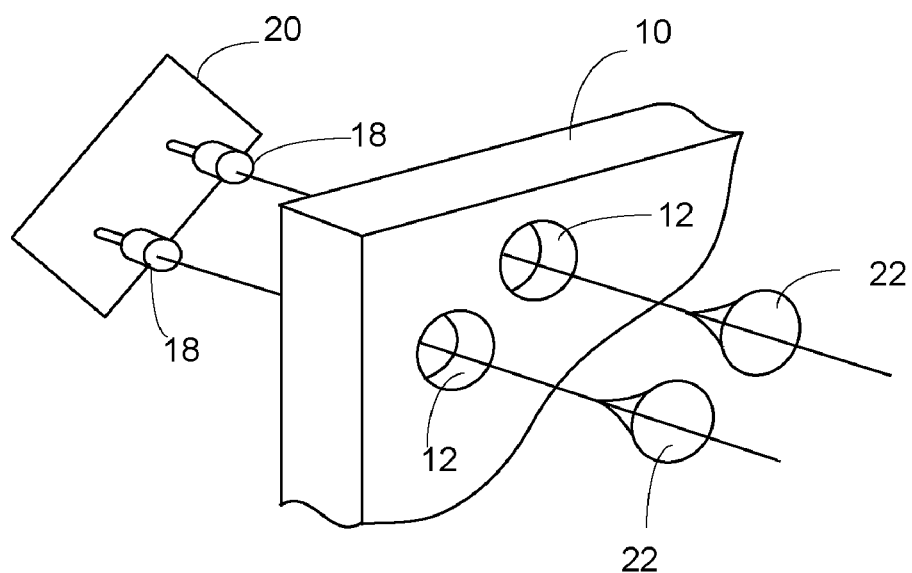
FIG. 4 is a perspective view of the writing surface of FIG. 1 showing an example embodiment of an electronic transcription apparatus according to this invention.

FIG. 4 shows a perspective of how the apparatus shown in FIG. 2 is pre-assembled, e.g., at the factory. Components 17 (FIG. 1) includes electronics assembly 20 that has all needed sensors for the apparatus, including but not limited to ultrasound sensors 18 and an infrared sensor 13, or in an alternate version, one or more optical sensors. Note that while one embodiment uses infrared, other forms of electromagnetic radiation can be used. In different embodiments, those sensors are installed on the circuit board assembly, or in another embodiment, elsewhere on the board and wired to the circuit board assembly. As in FIG. 1, components 17 including the electronics assembly 20, cabling 19, and connector 26 are designed to connect to an external module 24, to enable the full functionality of the transcription apparatus. While in the embodiment shown, the connections between the electronics assembly 20 and the external module 24 are wired, in alternate embodiments, some or all of the connections can be wireless.

In one particular embodiment of the apparatus, the built-in components 17 include the ultrasound sensors 18, an infrared sensor 13 and analog amplifiers coupled to each respective sensor to generate respective analog signals. The analog signals from assembly 20 are connectable to the external module 24 via a wired connection 19.

Defining Functionality

In one embodiment, once the components 17 are connected with a particular version of the external module, the combination is responsive to the connecting to cause one or more of the capabilities of the resulting transcription apparatus to be defined, that is, to define the mode of operation of the combination of the pre-assembled board or frame with the external module. For example, the external module can be one of a set of external modules that to which the components are connectable, and the particular external module to which the components are connected cause a determining of what the mode or modes of operation are, and thus what the capabilities are of the resulting transcription apparatus.

In one embodiment the components 17 include one or more identifiable characteristics, such that when connected to the external module, the identifiable characteristic(s) cause one or more of the capabilities of the resulting transcription apparatus to be defined.

In one embodiment, the connector 26 has one or more identifiable characteristics and is configured to match any of a plurality of matching connectors of a respective plurality of external modules. Connecting to a particular matching connector of a particular external module using the connector having the one or more identifiable characteristics causes one or more of the capabilities of the resulting transcription apparatus to be defined. In one embodiment, the identifiable characteristic is the particular shape of the connector. In such an embodiment, the connector is a particularly shaped connector 26, whose shape identifies the board used. Thus, the shape and/or other characteristic or characteristics of the connector 26, and how it connects determines what characteristics the complete transcription apparatus will have when connected to a suitable external module 24.

In another embodiment of the apparatus, include components for a wireless connection to an external module. The wireless connection between the electronics assembly 20 and the external module 24 includes a wireless link that includes unique identification. One version includes an RFID component or module, another uses Bluetooth that includes an identifier. Those in the art will understand that any other wireless connection that can be used for transferring data and creating an identification of the connection between the two modules.

In another embodiment, the electronic assembly 20 includes analog to digital conversion to convert the analog data into digital data. The digital data includes a key or other identifier usable as an identifier for the combination of the built-in components and the external module 24. In another embodiment, the digital data is signed and/or encrypted in a manner so as to provide the identification that defines one or more of the capabilities of the resulting transcription apparatus.

The inventors included in some embodiments the feature of using an identifiable connection, e.g., shaped connector or digital data that is encrypted or includes identifying information, or wireless connection, in order to prevent third party manufacturers from supplying the external module for the apparatus. There are many uses for such a feature. Recall that in general, the external module 24 includes a processor and a storage medium, e.g., memory, on which software is encoded. Such software can include software to perform additional desirable features related to what function are provided and/or permitted. One such function is to ensure that only authorized modules are used with the pre-assembled apparatus. Thus, a revenue stream is possible by licensing the right to supply different modules to work with the pre-assembled apparatus. An unauthorized module may thus be prevented from working with the pre-assembled apparatus, or at the very least to restrict features.

Furthermore, a business model can be set up in which authorization is required, and is available only for a short period of time. The software in module 24 is designed to limit the time period the combination is operational as a transcription apparatus. This allows licensing of the capabilities for a limited amount of time, e.g., a rental model and/or a subscription model.

Furthermore, different manufacturers can provide different versions of the pre-assembled apparatuses, and furthermore, different manufacturers can provide different external modules to work with one or the other pre-assembled apparatus. For example, a projector manufacturer can be licensed to design a projector such as a short throw projector to project onto a surface. A plurality of different manufacturers can be licensed to make modules that work with the short-throw projector to convert it to have transcription capabilities. As another example, one company can make and sell a pre-assembled apparatus that includes a whiteboard. Several different suppliers can make and market, and compete with each other, to sell external modules that work with the pre-assembled whiteboard to convert it into an apparatus having transcription capabilities. Furthermore, several models of external modules can be made to provide different sets of capabilities and features when connected to the same pre-assembled upgradeable part.

In one embodiment, the identifiable connection between the assembly 20 and external module 24 can be defined for a specific type or function of the board, for example transcription functionality only or projection functionality only. Examples of the type of parameter that can be defined by the identifiable connection is the size of the board, a capability of the board to split the functionality of the surface, where part of the board may be used for transcription and the other part for projection. The data from this apparatus will be transferred to the appropriate device or connection. For example, transcription data can be sent to a memory device, a printing device, or over the network to a server, and the projection stylus data can be sent to a PC computer or over the network.

To get the data from the electronics assembly 20 to the external module 24 any combination of the methods described above can be used. In one embodiment a mixed connection of analog and digital connections can be used and the connection itself can be wired or wireless. Using a mixed analog and digital connection can give the benefit of having a unique connection by using an encrypted key and transferring the sensor data without the complexity of converting it to digital data. The digital connection can be used to control various parameters of the apparatus as well as to transfer a unique key. For example, this connection can control the gain of the sensor data or the number of sensors connected.

Again recalling the external module in general includes a processor and a storage medium, e.g., memory, on which software is encoded. Such software can include software to perform additional desirable features. One embodiment can use an external module that includes a small display and/or one or more interaction elements to provide a user interface.

Figure 5A:
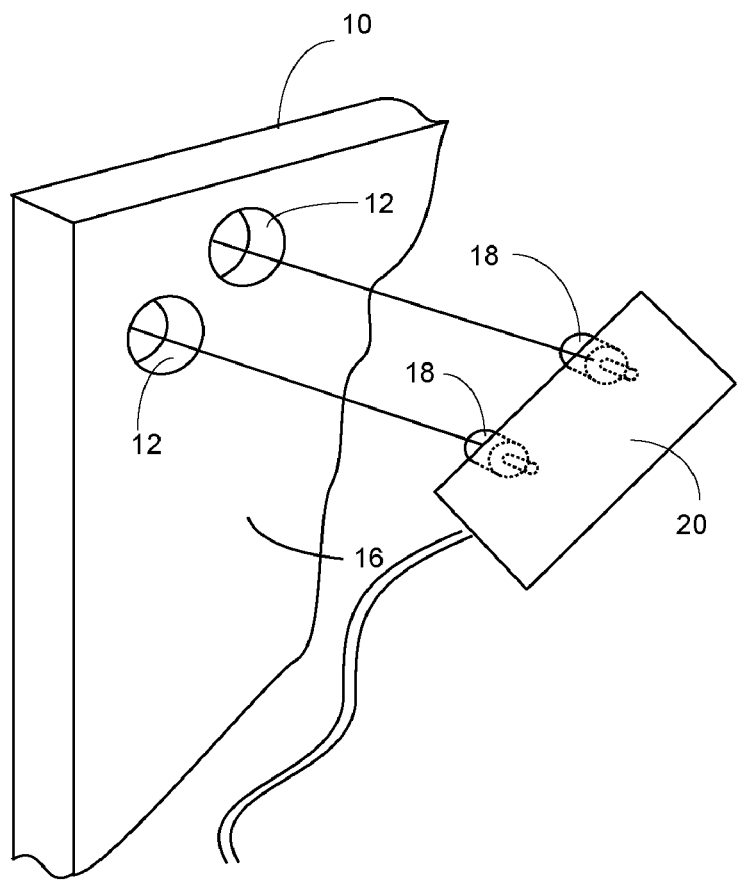
FIGS. 5A and 5B are perspective views of a first back portion of a board and a second back portion of a board according to an example embodiment of this invention.
Figure 5B:
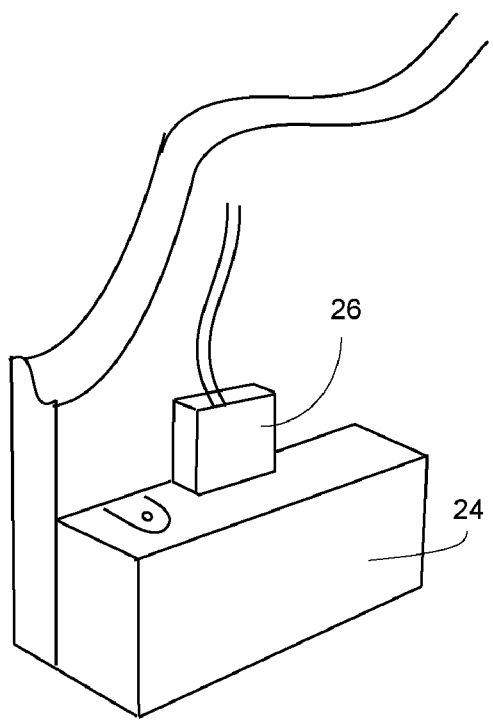

FIGS. 5A and 5B are perspective views of a first back portion of a pre-assembled board where the sensors are constructed and a second back portion of the pre-assembled board where an external module 24 is located according to an example embodiment of this invention. In such an embodiment, the board 10 includes some or all circuitry 18 and 20, and in some cases some elements of the external module 24 that together form an electronic transcription apparatus. For example, board 10 may include electronic components 23 that include inexpensive circuitry used in an electronic transcription apparatus with the external module 24. Mating connectors 26 are provided in one embodiment that allow a user to activate the pre-assembled transducers 18 and/or electronics assembly 20, for example, upon purchase of a transcription apparatus option. A user may then be able to install the external module 24 of electronic components, for example, upon purchase of an alternative transcription apparatus option.

In an alternate version, the board 10 with surface 14 does not include the transducers 18 and/or electronics assembly 20. When a user purchases an electronic transcription upgrade for the pre-assembled board, such an upgrade includes the transducers 18 and/or electronics assembly 20. The user then simply installs the purchased transducers 18 and/or electronics assembly 20, and connects to the external module 24.

In one embodiment, the built-in components when combined with an external module are inoperative until an activation method or device s used to activate or enable the electronic transcription apparatus. In one version, the transducers 18, electronics assembly 20 and electronic components 24 are included with the board 10 when sold to a user, but are inoperative until the user purchases and uses activation software to carry out an activation method. In another embodiment, the transcription apparatus is inoperable until a hardware key or other suitable device (not shown) is used to activate or enable the electronic transcription apparatus.

In general, to reduce costs of the upgradeable part, the external module 24 includes a significant part of the apparatus. In general, the transducers 18 and other components 17 that are pre-assembled with the board 10 are inexpensive and universally used for all configurations. The component included in the external module will change based on the capability required by the user. The capability can vary from only connecting to a PC or a printer to having multiple connections including wireless or wired connection to the network. The capabilities of the module 24 are designed to match the capabilities of the board 10, as defined by the manufacturer. The capabilities of the board are provided to the external module 24 by the identifiable connection described above.

One embodiment of the invention includes an interactivity connection hub embedded 30 into the board, e.g., close to the surface to enable the connection of other devices or peripherals to the apparatus. In one embodiment, the interactivity connection hub is a USB hub. Referring again to FIG. 1, a USB hub is shown that includes circuitry 30 in the circuit board 20 and a pair of USB ports 32 to which USB elements can be connected.

In one embodiment, the external module 24 connects to a power source. In another embodiment, the external module 24 includes a USB connection to a computer that includes power.

Figure 6:
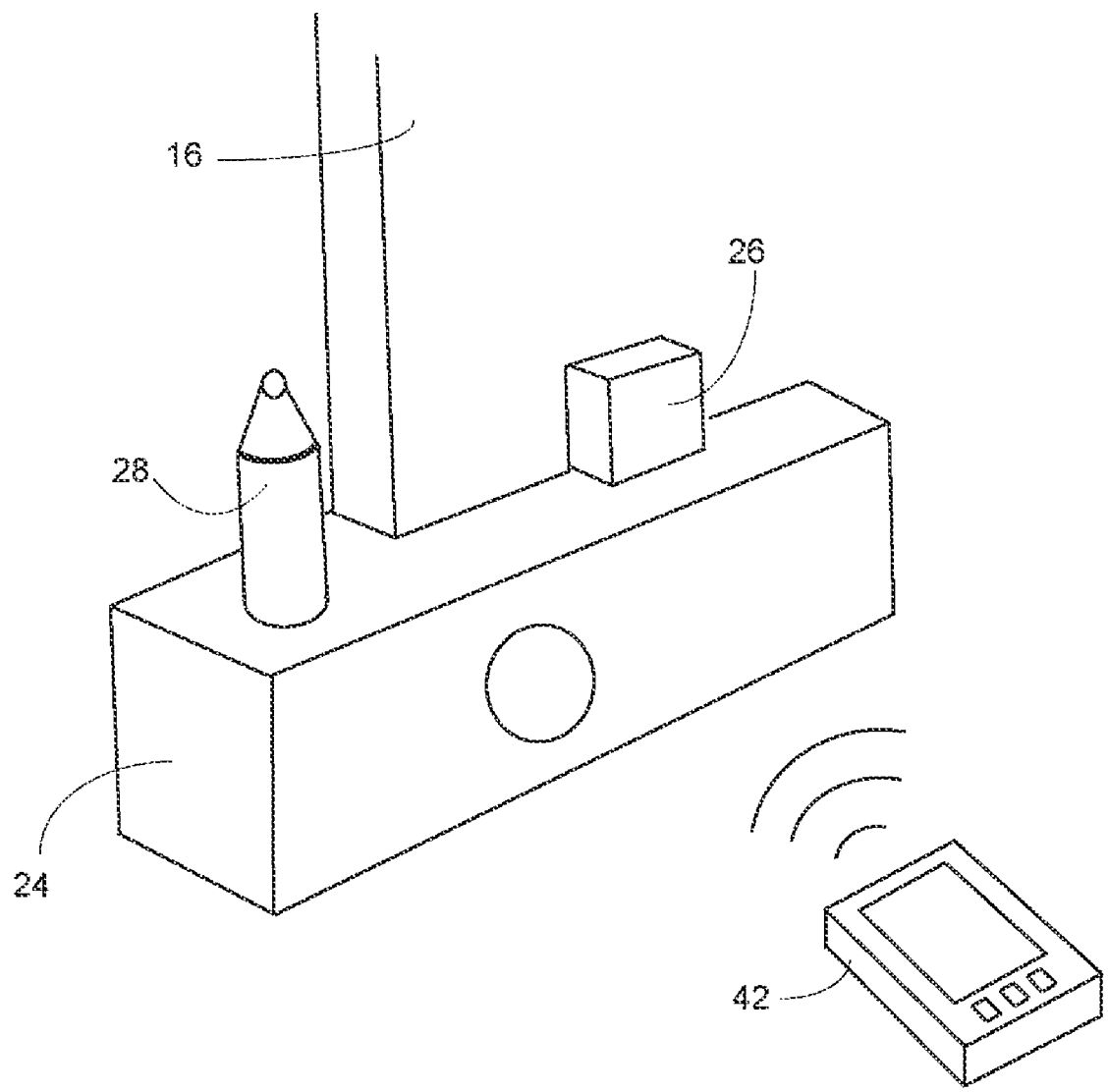
FIG. 6 shows one version of a module that includes a charger for a stylus that is powered by a rechargeable battery.

FIG. 6 shows one version of the module 24 that includes a charger for a stylus that is powered by a rechargeable battery. Different versions of the external module 24 have cradles that include chargers for one or more other components that are battery operated, such as a microphone or a remote control input device 42. Thus, in one embodiment, the external module includes a battery charger for wireless peripherals used for the electronic transcription apparatus. The user can have a limited use external module by connecting it directly to a PC or other peripherals without connecting it to the board. In this mode the module can be used as a memory device or a network interface, for example.

Transcription Mode and/or Projection Mode

The combination of the built-in components and external module defines the mode of operation of the combination of the pre-assembled board or frame with the external module. One mode includes operation is as a projection apparatus on which an image can be projected. Another mode includes a transcription mode wherein the apparatus is operable as a transcription apparatus once upgraded. Yet another mode includes a mixed mode that includes operation as a mixed projection and transcription apparatus.

Figure 7:
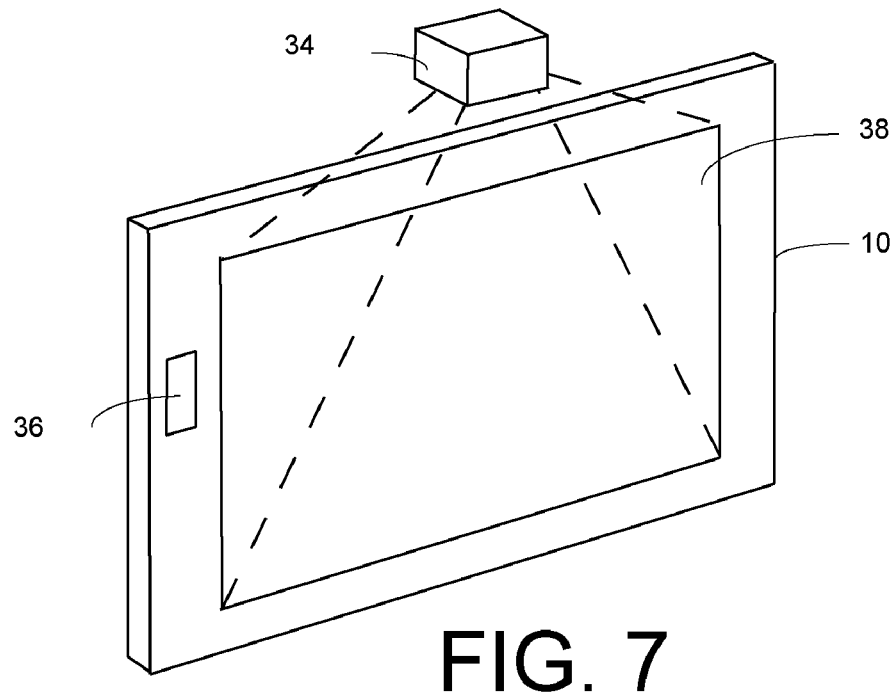
FIG. 7 is perspective view of an embodiment of the invention which shows a transcription apparatus that may be used in connection with a retrofittable or embedded apparatus.

Referring now to FIG. 7, one example embodiment of the invention is described, which includes projection element 34 and transcription apparatus 36. This apparatus may be provided in connection with a board 10 that includes a surface 14 that is configured to provide a projection surface, or a projection screen. Projection element 34 may be any conventional projection element, such as a liquid crystal display projector, digital light processing projector, or any other suitable projector, and may be positioned to form an image 38 on the board 10 that includes the surface 14, where image 38 is formed in a manner as is known in the art. The board 10 in an alternate embodiment is a transparent medium that allows projection element 34 to make use of known rear projection techniques.

In one mixed projection/transcription mode, part of the board's surface 14 is used as a projection surface, and another part of the board is used as a whiteboard on which one can make annotations, and capture the annotations using the transcription capabilities of the apparatus. There therefore is a division of the board between where one or more images are to be projected, and a pure transcription surface.

In one embodiment, the division of the board is by means of using the apparatus in a control mode to define functionality. The pointing device 28 and the position determining capabilities are used together to define the division of the board surface 14 between a projection surface and a transcription surface.

In some embodiment, the division of the board between transcription and projection surface is defined by a mechanical divider that is configured to provide information indicative of its location to the external module.

Figure 11A:
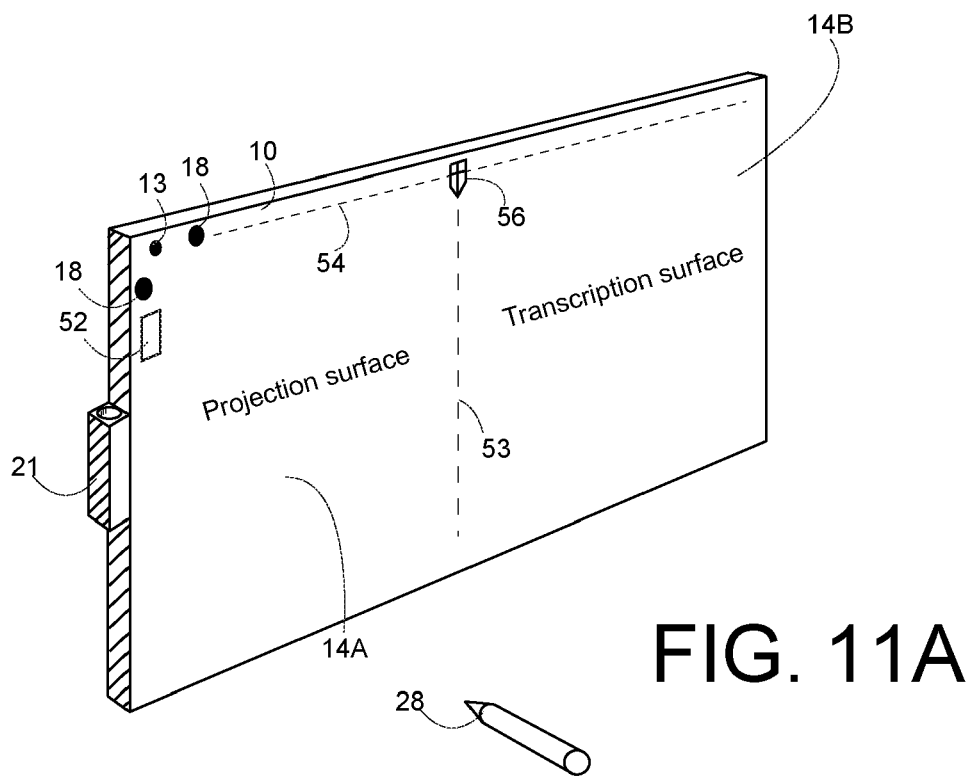
FIG. 11A shows a first embodiment of a mechanical divider to indicate a division of a surface to a projection area and a transcription area according to a feature of some embodiments of the invention.

FIG. 11A shows a first embodiment of such a mechanical divider made up of a resistive element 54 with a slideable mechanical element 56 used to define the division. Shown are a projection area 14A and a transcription area 14B, the division shown by broken line 53 defined by the position of the mechanical element 56 along the resistive element 54. The information is provided in the form of the resistance, e.g., with the mechanical elements acting a part of a potentiometer.

Figure 11B:
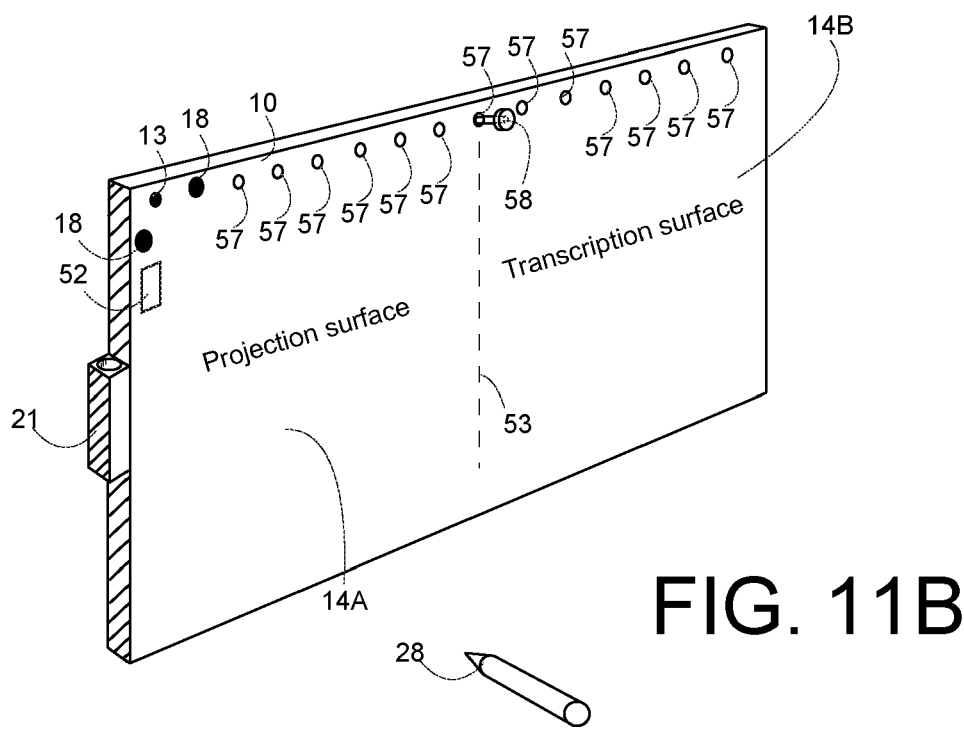
FIG. 11B shows a second embodiment of a mechanical divider to indicate a division of a surface to a projection area and a transcription area according to a feature of some embodiments of the invention.

FIG. 11B shows a second embodiment of such a mechanical divider made up of a plug 58 that can fit in a series of holes 57. Which hole the plug 58 is inserted into defines the division. There are many ways such a plug position can provide information on the position, and how to incorporate this feature would be clear to one of ordinary skill in the art from the description herein. Shown are a projection area 14A and a transcription area 14B, the division shown by broken line 53 defined by the position of the plug 58 along the series of holes 57.

Wireless Input Device

Figure 8:
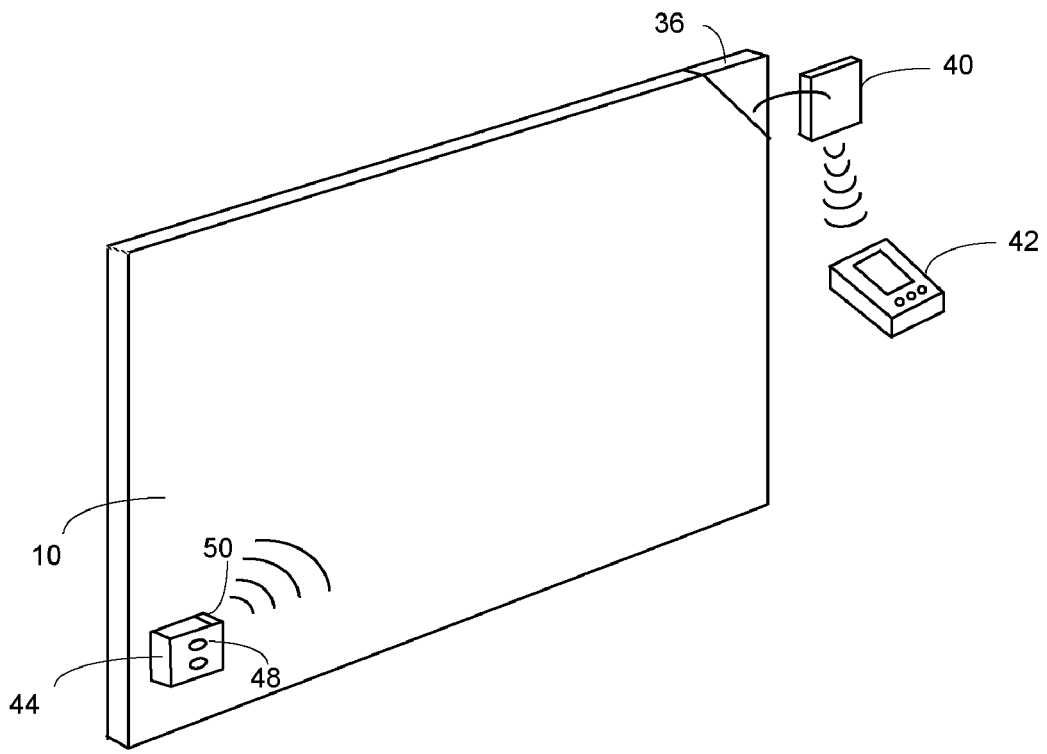
FIG. 8 is a perspective view of an electronic transcription apparatus according to the invention in which a wireless interface is provided.

FIG. 8 illustrates another embodiment of the invention in which a wireless module may be used to communicate data produced by, or for use by, the transcription apparatus with one or more remote devices. Wireless device 40 may be coupled to board 10 with surface 14 via, e.g., transcription apparatus 36, and may include an infrared (IR) transmitter that is adapted to send information to IR receiving device 42, such as a Palm Pilot, personal organizer, personal digital assistant, cellular telephone, personal handheld computer, laptop computer, or other suitable device. IR device 40 may be bi-directional such that the operation of transcription apparatus 36 may be controlled by the device 42. Persons of ordinary skill in the art will understand that wireless communication may be accomplished by any known mechanism, for example IR, radio frequency (RF), microwaves, lasers, or any other suitable method. The communications protocol between transcription apparatus 36 and device 40 may be via the Bluetooth or 802.11 protocols. Those skilled in the art will appreciate that any other protocols may be used for such communication.

Also shown in FIG. 8 is optional wireless function module 44 that may include one or more input devices, collectively shown as a single device 48, for inputting function commands to transcription apparatus 36. Module 44 may be placed on or near writing surface 10, and may be used to communicate desired function commands, such as "print screen," "next page," "save," "erase," or any other suitable command to transcription apparatus 36. Another use is by connecting one or more of those modules for creating a voting apparatus that can get input from a number of users simultaneously. Input devices 48 may be push-button switches, touch-sensitive elements, or any other suitable devices for indicating a user-activated command. When a user presses input device 48, circuitry (not shown) inside module 44 it causes infrared transmitter 50 to transmit an infrared signal having identifiable characteristics (e.g., signal amplitude, frequency, pulse repetition frequency, etc.) that may be detected by infrared receivers in transcription apparatus 36. Transcription apparatus 36 may then decode the received infrared signals and execute the desired command.

Remote Control Devices for Presentations

In one embodiment, the at least one input device 48 includes a remote control device. One application is for making presentations, e.g., projected or displayed presentations. Remote controls designed for presentations, so called "presentations remote controls" are known in the art designed for use in making presentations such as Microsoft PowerPoint™ presentations. Such presentation remote controls are available with a wireless (radio) transmitter, an infrared transmitter, or both a radio and infrared transmitter. The radio transmitter and/or infrared transmitter is/are designed to transmit coded messages to be received by a matching wireless receiver and attached electronic configured to interpret the coded transmitted signals. One version of a wireless transmitter and matching receiver uses Bluetooth. In one embodiment of the invention, the built-in components include one or more sensors configured for use with one or more remote controls such as presentation remote controls.

In one embodiment designed to operate with a remote control that uses infrared, the pre-assembled board includes an infrared sensor 13 used to receive infrared pulses transmitted by the pointing device (the stylus), and the infrared sensor is also configured to receive coded infrared signals transmitted by the presentation remote control.

In one embodiment designed to operate with a remote control that uses wireless signals, the pre-assembled board includes built-in an antenna for receiving wireless signals transmitted by such a remote control. In one such embodiment, the board includes at least some of the radiofrequency components connected to the antenna needed for receiving the radio signals from the remote control.

In one embodiment, multiple remote input devices 48 can be used for input to the apparatus, even at the same time. Each remote input device is configured to transmit with an identifying code, such that the multiple remote input devices can be used for such applications as polling and voting during a presentation.

Figure 9:
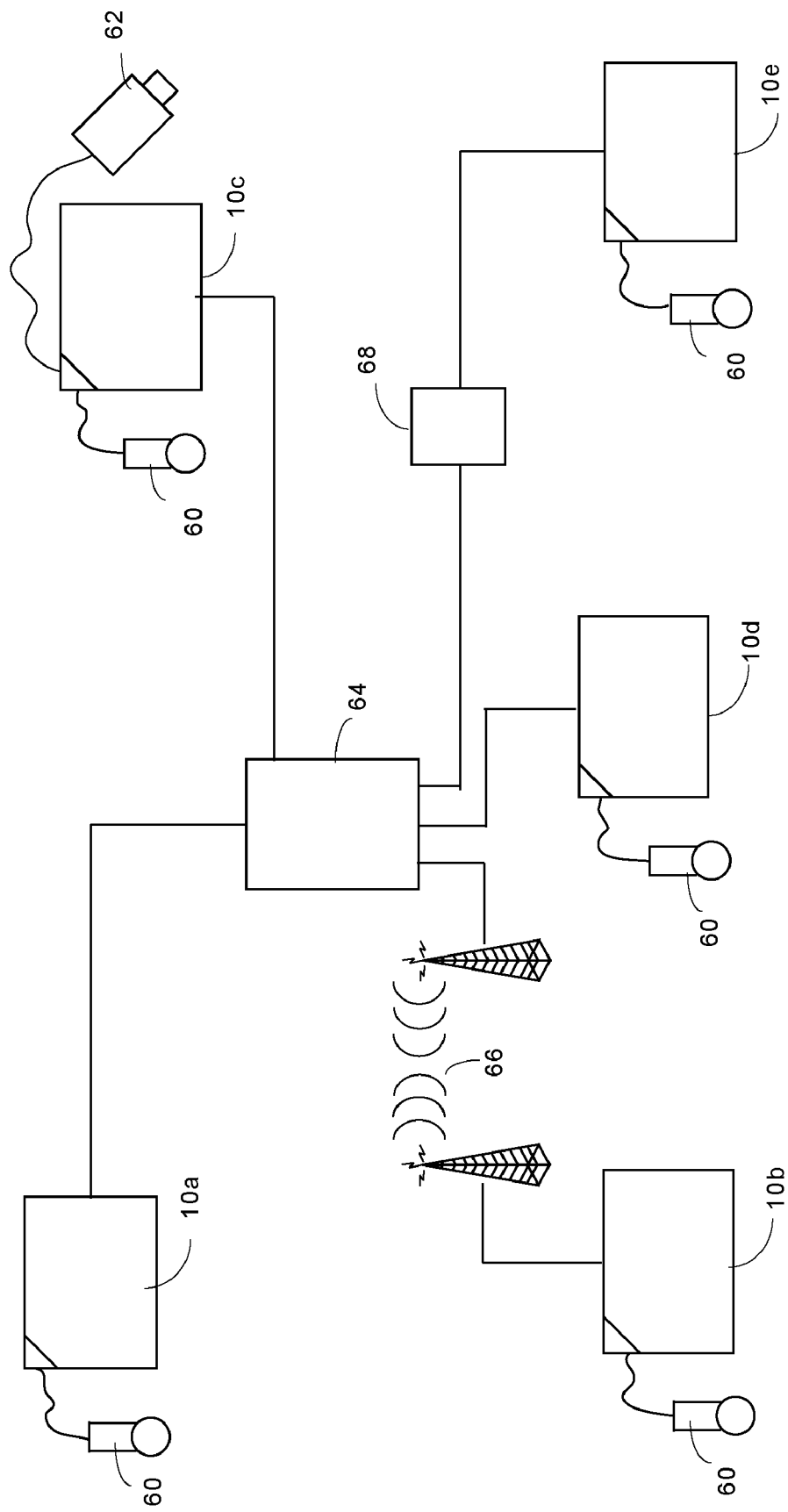
FIG. 9 is a block schematic diagram of an electronic transcription apparatus according to the invention which incorporates a transcription session server according to the invention.

FIG. 9 shows another embodiment of the present invention in which operation of several boards 10a-10e is coordinated from a central location, for example, by a server 64 in an office building or campus having several conference rooms or other whiteboard locations. Such an embodiment is useful, for example, for conferencing applications.

One embodiment of the invention the built-in components in the in the pre-assembled board include components usable to provide communication capacities. In one embodiment, the built-in components include mounting features usable to add one or more particular external modules that provide one networking capacities, such that a user can upgrade the pre-assembled board to have the networking capacities without having to modify the pre-assembled board.

In one embodiment, the pre-assembled board's built-in components include mounting features usable to add one or more particular external modules that provide audio, video, and/or communication capacities, such that a user can upgrade the pre-assembled board to have audio, video, and/or communication capacities without having to modify the pre-assembled board, e.g., when voice and/or video conferencing capabilities usable for conferencing are desired.

Referring to FIG. 9, at some or each location, voice and/or video capabilities usable for conferencing has been so added at some locations. Each of boards 10a-10e is shown having an audio device 60 connected to the pre-assembled board via a pre-configured connector and electronic connections to provide audio conferencing. Board 10c is shown also to include a video device 62 connected to the pre-assembled board via a pre-configured connector and electronic connections to provide to provide videoconferencing capabilities. Each of the boards also is shown to provide videoconferencing capabilities with a network connection connected to the respective pre-assembled board via a pre-configured connector and electronic connection. In one embodiment, the pre-assembled board includes a pre-configured connector and electronic connection that is connectable to an external communication hub that provides the communication capabilities. In one embodiment, the pre-configured board includes an internal hub that provides one or more of the foregoing mentioned connections via a pre-configured connector. In another embodiment, some connections are provided via an internal hub, while others are provided via an external hub.

In the embodiment shown in FIG. 9, the boards 10a-10e are coupled to a server 64. Server 64 is used to affect intercommunication between the various whiteboard and conferencing facilities to allow multi-party, interactive sessions. Board 10b is shown coupled via a wireless network connection 66, which boards 10a, 10c, and 10d are shown coupled via standard network connections, while board 68 is shown coupled via a network switch 68. How to build such network connections 68 is known in the art.

The internal or external hub in one embodiment provides one or more of Ethernet connection, wireless network connections such as IEEE 802.11 (WiFi) connection, 802.16 (WiMax) connection, Bluetooth connections, and/or iRDA connections.

Such internal or external hubs may also include any other connections, for example Ethernet connections, video, e.g., VGA, connections, scanning device connections, e.g., CCDs, printer connections, and others as desired.

Figure 10:
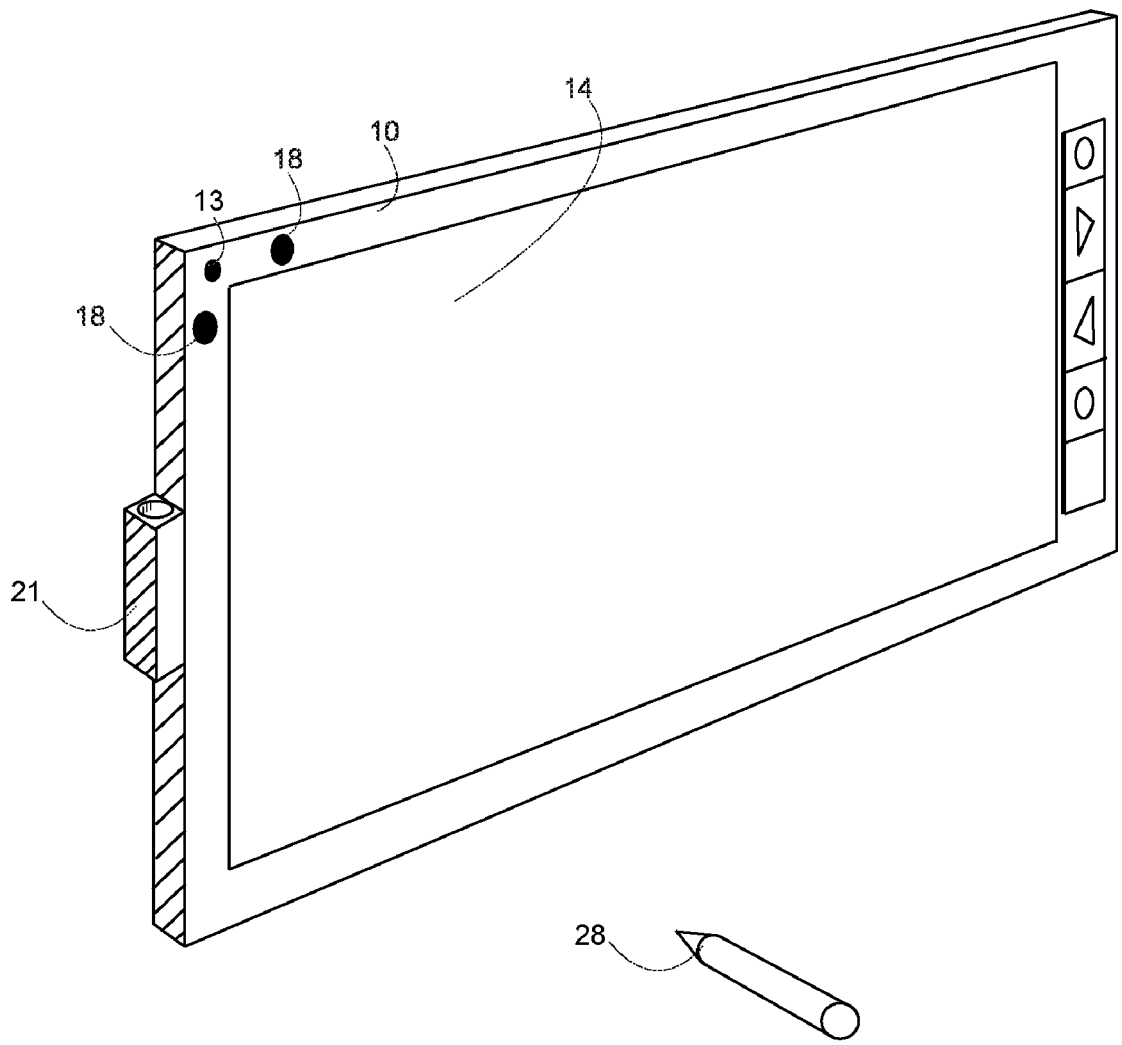
FIG. 10 shows another embodiment for operation with a flat panel display such as an LCD or plasma display.

FIG. 10 shows another embodiment of a pre-assembled board for operation with a flat panel display device such as an LCD or plasma display that has a front surface 14. The pre-assembled board includes a frame 10 is configured to fit around the display, a plurality of built in sensors, and built in components coupled to the sensors, including electronic components. The built in components are configured such that a user can readily convert the apparatus to be an electronic transcription apparatus for transcribing locations of a movable pointing device, e.g., when the pointing device is at or near the surface 14. Shown in front of the frame 10 are two built-in transducers 18, e.g., ultrasound transducers. There also is an infrared sensor 13 built in. Also shown is a built in charging cradle 21 for an electronic movable pointing device 28 that includes a transmitter of ultrasound pulses and of infrared pulses. An external module 24 (not shown in this drawing, but can be similar to those shown in different drawings herein) is connectable to the frame to transform the frame to a functioning electronic transcription apparatus as described above.

One embodiment of the invention includes one or more sensors for sensing environmental information including but not limited to one or more of a temperature sensor, a humidity sensor, an ambient light sensor, and/or an ambient ultrasound sensor. The data collected by the one or more sensors for sensing environmental information is used for improving operation of the apparatus.

One embodiment includes a temperature sensor. FIG. 11A and FIG. 11B each show a temperature sensor 52 built into the board that is functional to provide an indication of temperature when the built in components are connected to an external module 24. The speed of sound across air is known to depend on temperature. The external module 24 includes a processor and software in a medium configured to cause a calibration method to be carried out using an indication of temperature obtained from the temperature sensor.

In one embodiment that uses ultrasound and infrared pulse pairs transmitted from the pointing device, the one or more sensors for sending environmental information include an ultrasound detector and an ultrasound noise detecting process to detect an indication of the level of ultrasound interference. In one version, the ultrasound noise detecting process uses the same ultrasound sensors as sensors 18, and in another, a separate ultrasonic detector is used. One source of such ultrasound interference is the presence of one or more ultrasonic motion detectors in the room. The ultrasound emitted from such detectors can interfere with the detection of the ultrasound pulses emitted from the pen. In one embodiment, the ultrasound noise detecting process provides an indication or communicates with the pointing device to change transmit condition, such as signal strength and/or pulse frequency.

In one embodiment that uses ultrasound and infrared pulse pairs transmitted from the pointing device, the one or more sensors for sending environmental information include an infrared detector and an infrared noise detecting process to detect an indication of the level of infrared interference. In one version, the infrared noise detecting process uses the same infrared sensor as used to detect the infrared pulse of the transmitted pulse pairs, and in another, a separate infrared detector is used. In one embodiment, the infrared noise detecting process provides an indication or communicates with the pointing device to change transmit condition, such as infrared signal strength and/or pulse frequency.

Note that while in the embodiments described above, the external module 24 converts the board into an electronic transcription apparatus, in one embodiment, the external module 24 can be used independently from the writing surface. The module can connect directly to a PC, network, or other peripherals and can be used without connection to built-in sensors, e.g., ultrasound sensors of the board.

In one embodiment, the board includes an orientation sensor such that when connected to an external module, the resulting transcription apparatus has knowledge of whether the board is horizontal or vertical. Such orientation sensing is known in the art, and is used, for example, to determine the orientation of display devices. One embodiment of the built-in components includes a mercury switch in the board acting as an orientation detector. FIG. 11A shows such an orientation detector 59.

External Module User Interface

In one embodiment one of the external modules includes a display, e.g., a small LCD display on which is displayed a user interface, and/or one or more interaction elements that provides a user interface. The user interface allows a user to interact with the system and might include one or more actual or displayed buttons, sliders, etc., that provide a mechanism for the user to interact. That is, in one embodiment, an external module 24 includes a processor, memory including software, and a display and/or one or more interaction element to form a user interface. In one version, the software is configured such that the display displays a user interface. When the external module is connected to the pre-assembled part, the user interface is activated. A user enters information in the user interface, e.g., authorization information to enable operation. This allows flexibility by providing different capabilities and/or properties for different applications and different users. Furthermore, this can allow cost savings by only including the elements that are necessary for the intended function.

Limited Time

In one embodiment one of the external modules includes a processor, and memory including software. The software is configured such that when the module is connected to the pre-assembled part, and identified, e.g., via some identifiable characteristic of the connection, the capabilities are limited to be operational for a limited period of time. This allows for a rental business model, and/or a subscription model to be used. How to include a time limited feature according to one or more identifiable characteristic, e.g., using software would be clear to one of ordinary skill in the art.

Upgradeable Projector Having an Associated Surface

Figure 12:
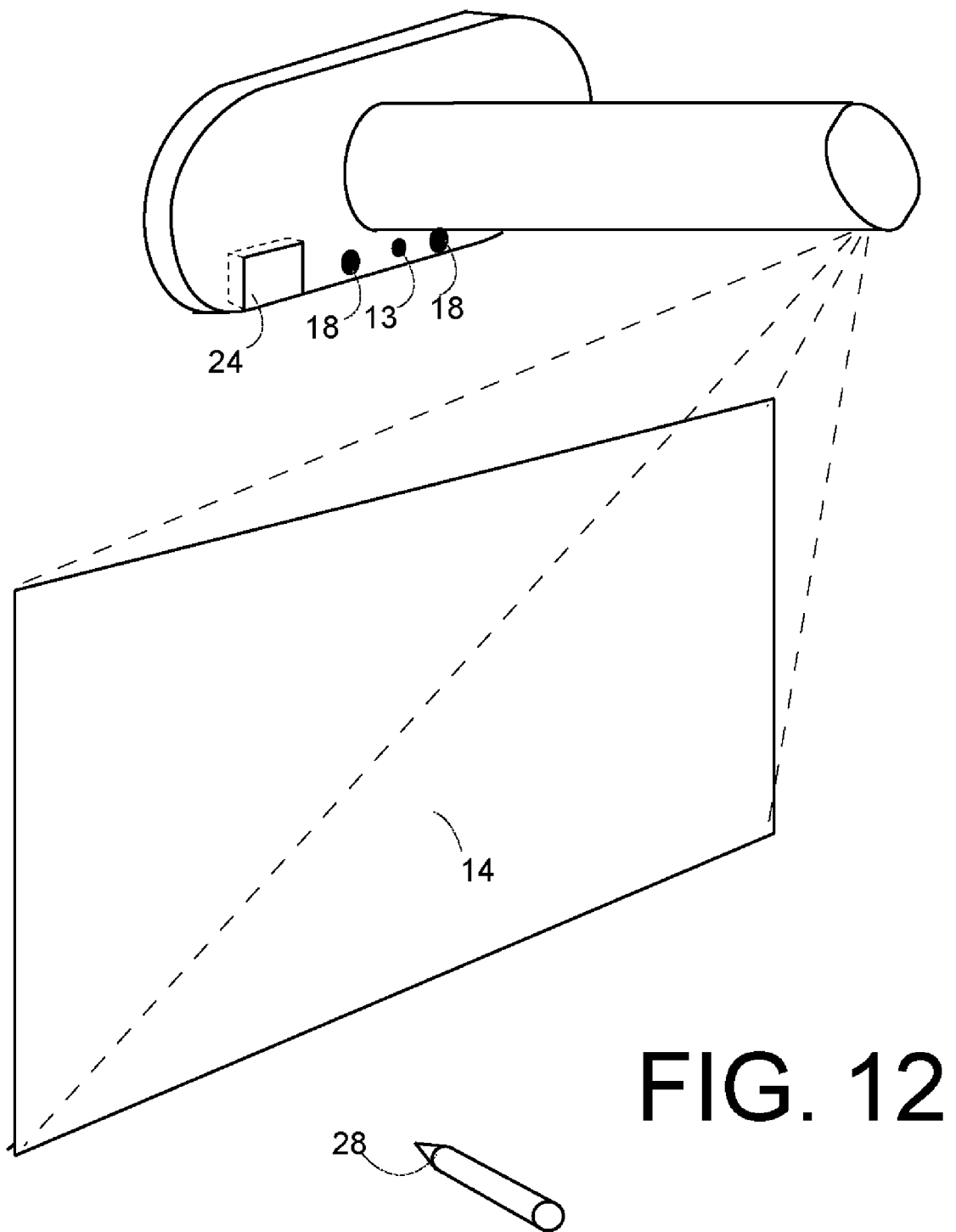
FIG. 12 shows a first embodiment wherein the pre-assembled part is a projection device. In this embodiment, the sensors are part of the projection device.

FIG. 12 shows a first embodiment wherein the pre-assembled part is a projection device, such as a short throw projector. The associated surface 14 is the projection surface for the projector. In the version shown in FIG. 12, the built-in components includes built in acoustic sensors and a built in electromagnetic sensor 13. The design of the projector system can be similar to the 3M Digital Media 800 Series™ made by 3M Visual Systems of Austin Tex. Other manufacturers also make short-throw projectors suitable for use in this manner. Different one(s) of external modules, one such module 24 shown connected, allow the projector to have different annotation/transcription functionality.

Figure 13:
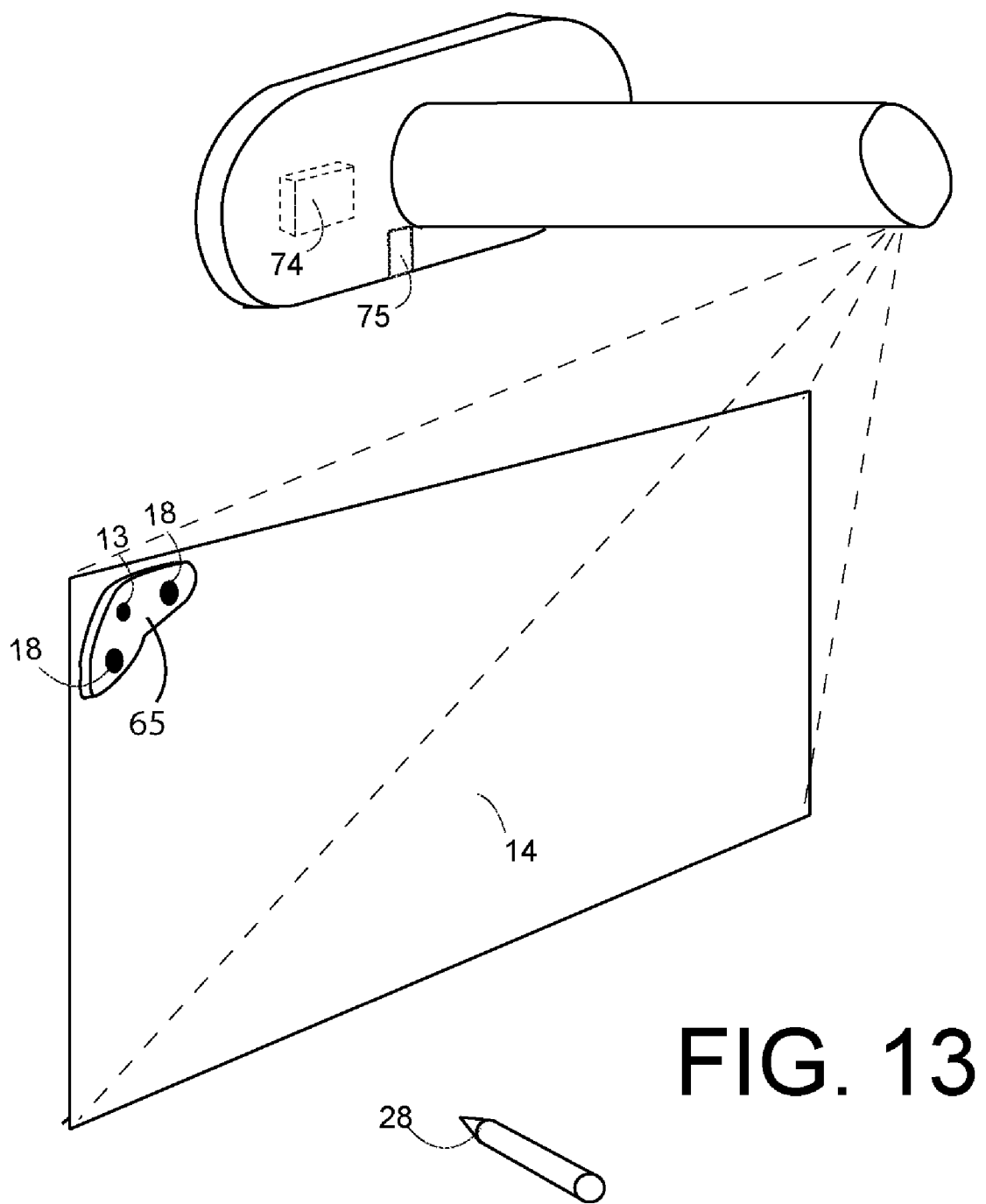
FIG. 13 shows a second embodiment wherein the pre-assembled part is a projection device. In this embodiment, the sensors are part of the external module.

While in the versions shown in FIG. 12, the projector includes the built-in sensors, in another embodiment shown in FIG. 13, the projector includes built in electronics, and the external module includes a sensor array 65 configures to be connectable to built-in components 74, e.g., via a connection socket 75 or via a wireless connection. The sensor array 65 includes in one embodiment two ultrasound sensors 18 and an infrared sensor 13. Note that the 3M Digital Media model 815 includes many of the elements of the system shown in FIG. 13, except the identifiable connection. It is the identifiable connection that provides that only authorized sensor array may be used with the short throw projector to provide the transcription apparatus capabilities. Having this requirement allows a projector to be sold that does not have the capabilities, and then for one to purchase, or rent, or license the additional external component—in this case the external module 65 in order to allow the transcription apparatus capabilities. Furthermore, one can limit the time period for which the capabilities are operational, and then sell additional time. When the authorization is electronic, such time limits and selling of additional time periods can be carried out using methods known in the art, e.g., as applied to digital rights management.

In one version, the surface of the boards includes a plurality of sets of sensors that can cover a larger area than is coverable by a single set of sensors. The actual active size of the board is defined by the type of external module 24 connected to it.

Co-owned U.S. patent application Ser. No. 11/968,127 to inventor Ding described a method, a software product, e.g., as logic encoded on one or more tangible media, and an apparatus for stroke capture and retrieval that works with an annotation capture and recording system that can operate with several styli active at the same time, and/or that can be formed using a plurality of panels to form a large working area. The contents of U.S. application Ser. No. 11/968,127 are incorporated herein by reference. In one embodiment, the external module to which the board or frame is connectable includes a module that enables multiple pens to be operational at the same time, and/or uses multiple built-in sets of sensors to enable a larger active area to be defined.

In particular, when upgraded, the resulting transcription apparatus comprises a surface and one or more receiver subsystems each placed at a respective set of selected locations relative to the surface. The selected locations are to define a working area on the surface. Each receiver subsystem includes an electromagnetic signal sensor operative to receive electromagnet signals from one or more styli when the one or more styli are operating in the working area. Each stylus including a power source, a transmitter of ultrasound energy, at least one transmitter of electromagnetic signals, and a sensor of electromagnetic signals. Each receiver subsystem also includes an electromagnetic energy signal transmitter operative to send electromagnet signals to one or more styli when the one or more styli are operating in the working area. Each receiver subsystem also includes at least one ultrasound signal sensor operative to receive ultrasound signals from the one or more styli when the one or more styli are operating in the working area. In the case the receiver subsystem includes at least two ultrasound signal sensors and the apparatus is operative with only one receiver subsystem, two or more of the signal sensors of the receiver subsystem have a pre-defined or a determinable spatial relationship to each other. In the case each receiver subsystem includes only one ultrasound signal sensor, the apparatus includes two or more receiver subsystems whose respective ultrasound signal sensors have a pre-defined or a determinable spatial relationship to each other. The apparatus further includes at least one controller coupled to the one or more receiver subsystems and operative in combination with the one or more receiver subsystems to cause coordination of the transmitting by the styli, and operative in combination with the one or more receiver subsystems to determine the location of the one or more styli in the working area when the one or more styli are operating in the working area, such that more than one stylus can operate at the same time in the working area.

Note that the invention is quite general as to the relationship of the pre-assembled part and the associated surface. The associated surface may be any surface on which one may make marks or point out position. Examples of such surfaces include, but are not limited to: a whiteboard, a blackboard, an easel, a wall, a display monitor such as a CRT monitor or a flat panel display, e.g., an LCD or display, a projection screen, a tabletop, a writing tablet, and so forth.

In the context of this document, the term "wireless" and its derivatives may be used to describe circuits, devices, apparatuses, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing apparatus, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of steps is implied, unless specifically stated.

Note that the external module is not shown in some of the drawings. Those in the art will understand that the transcription functionality described herein requires such a module to be connected.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or apparatuses wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow. For example, the invention may incorporate such elements as a printer, scanner, projector, camera, or microphone, all within a pre-assembled/ reconfigurable form factor, e.g., the invention may provide openings and/or connections within a writing surface for attaching or otherwise incorporating such devices, or may include locations within the writing surface for positioning such devices.

What is claimed is:

1. A method of converting a pre-assembled part for use as an electronic transcription apparatus that uses a set of sensors to determine the location of a pointing device that transmits, the method comprising:

upgrading the pre-assembled part to cause the pre-assembled part to be configured as the electronic transcription apparatus having at least one transcription capability, the pre-assembled part including built-in components including built-in electronics, and having associated therewith a surface or a frame for a surface, wherein the upgrading includes a user adding at least one external module, the adding of one or more particular external modules causing the pre-assembled apparatus to be configured, using the built-in components and the one or more particular external modules, as an electronic transcription apparatus having at least one particular set of transcription capabilities including the capability that when a pointing device that includes at least one transmitter of energy transmits energy, the transmitted energy is sensed at least some of the set of sensors, and the sensed energy is used to determine the position of the pointing device on or near the surface, wherein either the pre-assembled part or the external module includes a plurality of sensors, wherein the built-in components include one or more identifiable characteristics, and connecting to an external module includes automatically identifying a particular set of one or more of the identifiable characteristics, such that when connected to the external module, the identified one or more identifiable characteristics cause a particular set of one or more of the capabilities of the resulting transcription apparatus to be automatically defined from a plurality of possible sets of capabilities, wherein the at least one external module includes at least one of: at least one of the sensors; a video component; an audio component; a component to match a built-in RFID component; a USB connector; a network component; a component with a processor storage with software in the storage; a projector; a small display; one or more interaction elements to provide a user interface; one or more input devices; one or more environmental sensors; and a stylus, and wherein the particular set of one or more of the identifiable characteristics include at least one of: the number and nature of the sensors, whether the built-in or the external module has the plurality of sensors, whether or not a projection surface, one or more identifiable characteristics of a connector; identifiable wireless connection characteristics of components for a wireless connection to an external module; RFID component to provide an identifiable connection using RFID; at least one of data encryption and a unique key; one or more authorization characteristics.

2. A method as recited in claim 1, wherein the built-in components include a connector that has one or more identifiable characteristics and configured to match any of a plurality of matching connectors of a respective plurality of external modules, such that a particular matching connector connected to the connector having the one or more identifiable characteristics causes the particular set of one or more capabilities to be automatically defined from the plurality of possible sets of capabilities.

3. A method as recited in claim 1, wherein the built-in components include components for a wireless connection to an external module using an identifiable wireless connection that is configured to define one or more sets of the plurality of possible sets of capabilities of the resulting transcription apparatus, such that the particular set of one or more of the capabilities are defined as a result of wireless connection.

4. A method as recited in claim 1, wherein the identifying a particular set of the identifiable characteristics uses data encryption and/or a unique key of a plurality of possible data encryption and/or keys, such that a particular data encryption and/or a particular unique key matches the pre-assembled part to an external module to define the particular set of one or more capabilities of the resulting transcription apparatus from the plurality of possible sets of capabilities.

5. An apparatus configured for upgrading to an electronic transcription apparatus that uses a set of sensors to determine the location of a pointing device that transmits, the apparatus comprising:
a pre-assembled part having associated therewith a surface or a frame for a surface, the pre-assembled part including built in components including electronic components,
wherein either the pre-assembled part or the external module includes a plurality of sensors,
wherein the pre-assembled part is configured such that a user's upgrading the pre-assembled part causes the pre-assembled part to be configured as an electronic transcription apparatus having at least one transcription capability, the upgrading including a user adding at least one external module, the adding of one or more particular external modules causing the pre-assembled part to be configured as an electronic transcription apparatus having at least one particular set of transcription capabilities including the capability that when a pointing device that includes at least one transmitter of energy transmits energy, the transmitted energy is sensed by the plurality of sensors, and the sensed energy is used to determine the position of the pointing device on or near the surface,
wherein the built-in components include one or more identifiable characteristics, and connecting to an external module includes automatically identifying a particular set of one or more of the identifiable characteristics, such that when connected to the external module, the identified one or more identifiable characteristics cause a particular set of one or more of the capabilities of the resulting transcription apparatus to be automatically defined from a plurality of possible sets of capabilities,
wherein the at least one external module includes at least one of: at least one of the sensors; a video component; an audio component; a component to match a built-in RFID component; a USB connector; a network component; a component with a processor storage with software in the storage; a projector; a small display; one or more interaction elements to provide a user interface; one or more input devices; one or more environmental sensors; and a stylus, and
wherein the particular set of one or more of the identifiable characteristics include at least one of: the number and nature of the sensors, whether the built-in or the external module has the plurality of sensors, whether or not a projection surface, one or more identifiable characteristics of a connector; identifiable wireless connection characteristics of components for a wireless connection to an external module; RFID component to provide an identifiable connection using RFID; at least one of data encryption and a unique key; one or more authorization characteristics.

6. An apparatus as recited in claim 5, wherein the sensors include at least two acoustic sensors pre-assembled to be at pre-defined positions and a sensor of electromagnetic energy.

7. An apparatus as recited in claim 6,
wherein the preassembled part includes a pre-assembled board having the surface or a frame for the surface, and
wherein the acoustic sensors include ultrasound transducers configured to work together with sound focusing elements on the surface, the ultrasound transducers being pre-mounted on a circuit assembly, the board including apertures through which the transducers protrude to extend to or beyond the front surface of the board or frame when the circuit assembly is pre-assembled in the board or frame, and
wherein each sound focusing elements each has a shaped surface such that ultrasound waves emitted from a transmitting pointing device are directed to the respective ultrasound transducer in the respective aperture.

8. An apparatus as recited in claim 6,
wherein the preassembled part includes a pre-assembled board having the surface or a frame for the surface, and
wherein the acoustic sensors include sound transducers positioned at or close to the front surface of the board, each sound transducer configured such that focusing elements are not required when the transducers are so positioned at or close to the front surface.

9. An apparatus as recited in claim 8, wherein the sound transducers include transducers selected from the set consisting of piezoelectric film transducers, MEMS microphones, and electret microphones.

10. An apparatus as recited in claim 8,
wherein the acoustic sensors are spring-loaded, such that the transducers protrude from front surface 14 when the electronic transcription is desired to be used, and may be retracted when use of the electronic transcription apparatus is not desired.

11. An apparatus as recited in claim 6, wherein the sensor of electromagnetic energy is configured for communication with a remote control device that includes a transmitter of the electromagnetic energy.

12. An apparatus as recited in claim 5, wherein identifying the identifiable characteristics uses data encryption and/or a unique key of a plurality of possible data encryption and/or keys, such that a particular data encryption and/or a particular unique key matches the pre-assembled part to an external module to automatically define the particular set of one or more capabilities of the resulting transcription apparatus from the plurality of possible sets of capabilities.

13. An apparatus as recited in claim 5, wherein the built-in components include a connector that has one or more identifiable characteristics and configured to match any of a plurality of matching connectors of a respective plurality of external modules, such that a particular matching connector connected to the connector having the one or more identifiable characteristics causes the particular set of one or more capabilities to be automatically defined from the plurality of possible sets of capabilities.

14. An apparatus as recited in claim 5, wherein the built-in components include components for a wireless connection to an external module using an identifiable wireless connection that is configured to define one or more sets of the plurality of possible sets of capabilities of the resulting transcription apparatus, such that the particular set of one or more capabilities are automatically defined as a result of wireless connection.

15. An apparatus as recited in claim 14, wherein the built-in components include an RFID component to provide an identifiable connection to the external module using RFID.

16. An apparatus as recited in claim 5, wherein the built-in components include components usable to provide communication capacities, including networking capabilities.

17. An apparatus as recited in claim 5, wherein the pre-assembled part includes a projector and wherein the associated surface is the surface onto which the projector is configured to display the image.

18. An apparatus as recited in claim 17, wherein the projector includes the plurality of sensors built-in, the built in sensors coupled to at least some of the electronic components.

19. An apparatus as recited in claim 17, where each external module includes the plurality of sensors.

20. An apparatus as recited in claim 17, further comprising an interactivity connection hub with a connection port close to the surface to enable connection of other devices or peripherals to the apparatus.

21. An apparatus as recited in claim 20, wherein the interactivity connection hub is a USB hub.

22. An apparatus as recited in claim 5, wherein the pre-assembled part includes the plurality of sensors built-in, the built in sensors being coupled to at least some of the electronic components, and wherein the built-in components include an analog-to-digital conversion device configured to convert the output of the sensors to digital data and to sends the data to the external module for processing when the external module is connected to the pre-assembled part.

23. An apparatus as recited in claim 5, wherein the built-in components include one or more sensors for wireless communication configured to communicate with a remote control device that includes a wireless transmitter.

24. An apparatus as recited in claim 23, where multiple remote devices can be used for input to the apparatus at one time.

25. An apparatus as recited in claim 5, wherein the built-in components when combined with an external module are inoperative until an activation method or device is used to activate or enable the electronic transcription apparatus.

26. An apparatus as recited in claim 5, wherein the built-in components include one or more sensors for detecting environmental information.

27. An apparatus as recited in claim 5, wherein the built-in components include a temperature sensor, and wherein the apparatus when upgraded to be configured as an electronic transcription apparatus is configured to cause a calibration method to be carried out using an indication of temperature obtained from the temperature sensor.

28. An apparatus as recited in claim 5, wherein the external module includes a battery charger for wireless peripherals used for the electronic transcription apparatus.

29. An apparatus as recited in claim 5, wherein the external module includes a display and/or one or more interaction elements to provide a user interface function to a user.

30. An apparatus as recited in claim 5, wherein the external module is programmable and configurable to be operational for one or more of a limited period of time and/or limited capabilities.

31. An apparatus as recited in claim 5, wherein the external module defines the mode of operation of the combination of the pre-assembled part with the external module.

32. An apparatus as recited in claim 31, wherein the mode of operation is as a projection apparatus, a transcription apparatus, or a mixed projection and transcription apparatus.

33. An apparatus as recited in claim 5,
wherein the preassembled part includes a pre-assembled board having the surface or a frame for the surface, and
wherein the combination of the board or frame and a connected external module can work in mixed transcription and projection mode and the division of the board between transcription and projection surface is defined by a mechanical divider that is configured to provide information indicative of its location to the external module.

34. An apparatus as recited in claim 5,
wherein the preassembled part includes a pre-assembled board having the surface or a frame for the surface, and
wherein the built-in components include a sensor for the orientation of the transcription apparatus, such that when the board or frame is upgraded, the transcription apparatus is provided with an indication of whether the board or frame is perpendicular or horizontal.

35. An apparatus as recited in claim 5,
wherein the preassembled part includes a pre-assembled board having the surface or a frame for the surface, and
wherein the built-in components include a plurality of sets of sensors that can cover a larger area than is coverable by a single set of sensors, and wherein the active size of the board is defined by the type of external module connected to it.

36. An apparatus as recited in claim 5,
wherein the preassembled part includes a pre-assembled board having the surface or a frame for the surface, and
wherein the built-in components include a plurality of sets of sensors that can cover a larger area than is coverable by a single set of sensors, and wherein the active size of the board is defined by the type of external module connected to it.

* * * * *